US009295125B2

(12) United States Patent
Cordier et al.

(10) Patent No.: US 9,295,125 B2
(45) Date of Patent: *Mar. 22, 2016

(54) DEVICE AND METHOD FOR COMMUNICATION BETWEEN AN ELECTRONIC MODULE AND A DETECTION SENSOR COMPRISING A LIGHT SOURCE

(71) Applicants: CONTINENTAL AUTOMOTIVE FRANCE, Toulouse (FR); CONTINENTAL AUTOMOTIVE GmbH, Hannover (DE)

(72) Inventors: Maxime Cordier, Toulouse (FR); Xavier Hourne, Cugnaux (FR); Olivier Elie, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 207 days.

This patent is subject to a terminal disclaimer.

(21) Appl. No.: 13/940,750

(22) Filed: Jul. 12, 2013

(65) Prior Publication Data

US 2014/0015408 A1 Jan. 16, 2014

(30) Foreign Application Priority Data

Jul. 13, 2012 (FR) ...................................... 12 56761

(51) Int. Cl.
*H05B 33/08* (2006.01)
*H04B 3/54* (2006.01)
*H05B 37/02* (2006.01)
*B60R 25/00* (2013.01)

(52) U.S. Cl.
CPC ............ *H05B 33/0842* (2013.01); *B60R 25/00* (2013.01); *H04B 3/548* (2013.01); *H05B 37/0263* (2013.01); *H04B 2203/5412* (2013.01); *H04B 2203/5454* (2013.01)

(58) Field of Classification Search
CPC ...................................... H05B 33/0842
USPC ........................... 315/77, 307, 186, 122, 294
See application file for complete search history.

(56) References Cited

U.S. PATENT DOCUMENTS

| 7,028,819 B2 * | 4/2006 | Saito et al. ........................ 191/2 |
| 8,692,477 B1 * | 4/2014 | Lee ............................... 315/247 |
| 2014/0015407 A1 * | 1/2014 | Baudru et al. ................... 315/77 |

FOREIGN PATENT DOCUMENTS

| EP | 1 760 227 A1 | 3/2007 |
| WO | 01/54298 A1 | 7/2001 |
| WO | 2009/081424 A1 | 7/2009 |

OTHER PUBLICATIONS

French Search Report, dated Apr. 8, 2013, from corresponding French application.

*Primary Examiner* — Dinh Le
(74) *Attorney, Agent, or Firm* — Young & Thompson (57) ABSTRACT

Method for communication between an electronic module and a sensor having a first branch, including a light source LED and a first switch, and a second branch including a second switch, supplied by a supply line, the module measuring modulations of intensity of current of the line. When the light source is turned on or in the process of turning on/turning off, the sensor causes i) modulation of the intensity of the current in the LED between a high state and a low state, ii) modulation of the intensity of the current in the second branch so that the intensity of the current is always in a higher state, and, in case of detection, iii) dispatches to the electronic module a modulation of the intensity of current in the second branch, when the intensity of current in the LED is in the low state.

7 Claims, 3 Drawing Sheets

DEVICE AND METHOD FOR COMMUNICATION BETWEEN AN ELECTRONIC MODULE AND A DETECTION SENSOR COMPRISING A LIGHT SOURCE

FIELD OF THE INVENTION

The invention relates to a device and a method for communication between an electronic module and a detection sensor. More particularly, the invention proposes a device for communication between an electronic module onboard an automotive vehicle and a sensor sited remotely from the electronic module and situated on said vehicle.

BACKGROUND OF THE INVENTION

Nowadays, automotive vehicles comprise several electronic modules for controlling the diverse sensors and/or actuators situated on the vehicle. Certain modules manage the sensors and/or the actuators of the power train. They are called ECU ("Engine Control Unit"). Others manage the sensors and/or actuators situated in the bodywork of the vehicle, they are called BCM ("Body Control Module"), that is to say control module relating to the sensors and/or actuators situated in the bodywork of the vehicle. The BCM thus manages in particular the approach and/or contact detection sensors situated in the handles of doors of the vehicle.

These approach and/or contact detection sensors are capacitive sensors, known to the person skilled in the art, that detect the approach and/or the contact of a user's hand on a handle locking or unlocking zone. The capacitive sensor detects this approach and/or contact, and then it dispatches a detection information item to the BCM. The BCM receives this information item, as well as other information items originating from other sensors and/or actuators of the vehicle, for example the information item relating to the state of the door (locked/unlocked), or the information item relating to the identifier of the device for hands-free access to the vehicle, that is to say of the key or of the badge carried by the user. The microcontroller of the BCM then analyses all these data in order to verify that the user is properly authorized to access the vehicle and that a locking or unlocking can be carried out. If the user is authorized, the BCM then triggers the locking or the unlocking of the vehicle, that is to say it operates the actuators for locking or unlocking the door.

The dimensions of the vehicle's door handle being quite small, the latter generally contains only the detection sensor, that is to say a detection electrode, a microcontroller and associated electronics (electrical supply for example). Detection is carried out by the microcontroller integrated into the sensor, but the control of the locking or unlocking of the door is centralized in the BCM, on receipt of the approach and/or contact detection information item dispatched by the microcontroller integrated into the sensor and as may or may not be the case, as explained previously, on receipt of other information items originating from the vehicle.

Figure 1:
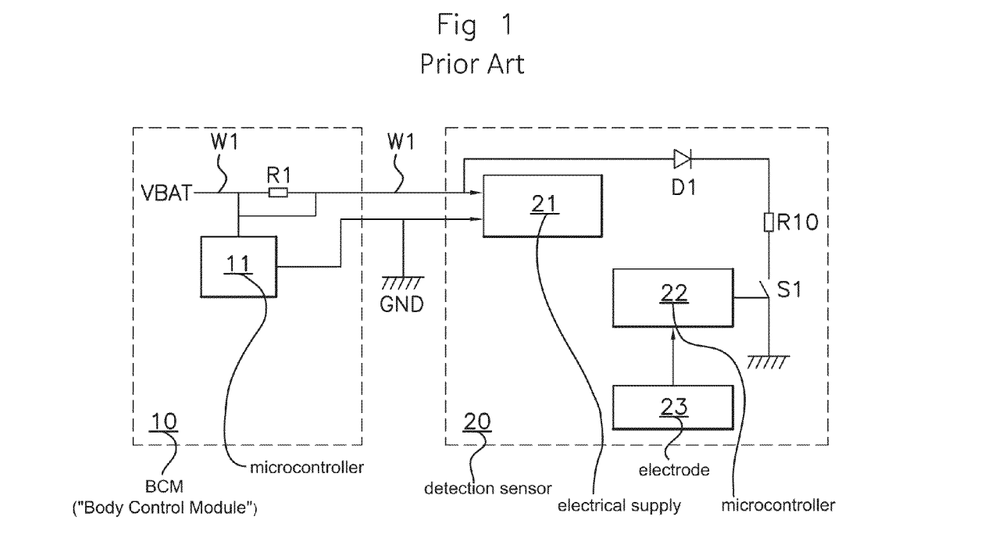
FIG. 1 represents an electrical diagram of a device for communication between a detection sensor and a BCM, according to the prior art.

There is therefore a unidirectional communication between the detection sensor and the BCM, since the sole function of the sensor is to inform the BCM when an approach has been detected. In FIG. 1 is represented the electronic diagram of the communication between a detection sensor 20 and a BCM 10. The BCM 10 comprises a microcontroller 11, connected to a voltage of the battery VBAT by a current-supply line W1, and connected to the ground GND. The BCM 10 also comprises a resistor R1, situated on the supply line W1. The microcontroller 11 of the BCM 10 and associated electronics (not represented) make it possible to measure a voltage across the terminals of the resistor R1.

The sensor 20 comprises an electrical supply 21 connected directly to the voltage of the battery VBAT, by the supply line W1, and connected to the ground GND by the BCM 10. The sensor 20 furthermore comprises a microcontroller 22, connected to an approach and/or contact detection electrode 23. The microcontroller 22 of the sensor 20 monitors the variation of the capacitance across the terminals of the electrode 23. When this capacitance exceeds a threshold, thereby signifying the approach and/or the contact of a hand of the user on the handle, the microcontroller 22 then dispatches an approach and/or contact detection signal to the BCM 10. Accordingly, the microcontroller 22 closes a first switch S1. This closure creates a current inrush through a resistor R10 and a diode D1 placed between the switch S1 and the supply line W1, downstream of the resistor R1. This current inrush propagates toward the BCM 10 and is then detected by the microcontroller 11 of the BCM 10 and the associated electronics, at the terminals of the resistor R1. By closing according to a determined sequence the switch S1, the microcontroller 22 of the sensor 20 thus dispatches an approach and/or contact detection signal to the microcontroller 11 of the BCM 10 by way of the supply line W1. The microcontroller 11 of the BCM 10, after analysis of this detection signal, undertakes the locking or unlocking.

This device is known to the person skilled in the art.

However, the latest trend is to add functionalities in the door handle of a vehicle, in particular to add a light source which will turn on according to one or more precise event(s) detected by the BCM 10. This light source, generally a light-emitting diode, commonly dubbed LED, is integrated into the sensor 20 and connected to the microcontroller 22.

This is carried out with the aim of user comfort or with the aim of esthetics. This light source is turned on for example when a certain darkness around the vehicle has been detected, and when a user authorized to access the vehicle has been detected in proximity to the vehicle. The turning on of the light source can also be triggered after the user gets out of his vehicle and the doors are closed so as to light up the locking zone situated on the handle on which he must press to lock his door. Or else, this light source is turned on when the user has touched the handle, in order to light up the unlocking zone on which the user must press to unlock the doors of his vehicle and get into his vehicle. These events (presence of an authorized user around the vehicle, getting out of the user, closing of the door, detection of contact on the handle, etc.), originating from the various sensors/actuators of the vehicle, are detected by the BCM 10.

Now, on the supply line W1, the current inrushes generated to turn on the light source are of the same order of magnitude as the current inrushes generated during the communication between the sensor 20 and the BCM 10. When the light source is turned on, communication from the sensor to the BCM 10 is therefore impossible.

The existing solutions propose to control the turning on of the light source by the addition of an extra wire link-up between the BCM 10 and the sensor 20.

Now, the addition of a wire link-up between the BCM 10 and the sensor 20 situated in the door handle is accompanied by problems regarding integration, because of the restricted space in the handle, problems regarding connection arrangements and cost for the BCM 10, since the latter must be specifically modified for the types of handles comprising an LED, and consequently a generic BCM common to all the types of handles is no longer conceivable.

SUMMARY OF THE INVENTION

The objective of the present invention is to propose a solution which makes it possible to manage the turning on and the turning off of the light source while allowing the transmission of the information items relating to the detection of a predefined event from the sensor to the BCM and therefore to manage, on one and the same supply line W1, the current inrushes generated to turn on the light source and the current inrushes generated during communication between the sensor and the BCM.

For this purpose, and according to a first aspect, the invention relates to a method for communication between an electronic module microcontroller and a detection sensor microcontroller. The detection sensor comprises a circuit comprising a first and a second branch in parallel, each connected to said microcontroller of the sensor via a switch. The two branches are supplied with current by way of a supply line connected to a voltage source. The detection sensor comprises, on the first branch, an actuator. The microcontroller of the electronic module is suitable for measuring the modulations of the intensity of the current flowing on said supply line between a so-called lower state and a so-called higher state. The microcontroller of the detection sensor controls the actuator by modulating the intensity of the current flowing in said actuator in such a way that:
  the actuator is in a first position when the intensity of the current flowing in the actuator is in a so-called low state,
  the actuator is in a second position when the intensity of the current flowing in the actuator evolves between the low state and a so-called high state, with a constant duty ratio of X %, X being strictly less than 100.

When the actuator is in the second position, the intensity of current flowing in the second branch is defined so as to be complementary to the intensity of current flowing in the first branch in such a way that the intensity of current flowing in the supply line is maintained in the higher state.

And, when a predefined event is detected by the detection sensor:
  when the actuator is in the first position, the intensity of current flowing on the supply line is in the lower state, the microcontroller of said detection sensor notifies the microcontroller of the electronic module with an information item according to which the event has been detected, in the form of a predefined modulation of the intensity of current flowing in the supply line with respect to the lower state,
  when the actuator is in the second position, the microcontroller of said detection sensor notifies the microcontroller of the electronic module with an information item according to which the event has been detected, in the form of a predefined modulation of current flowing in the supply line with respect to the higher state, solely when the intensity of current flowing in the actuator is in the low state.

According to the invention, the intensity of current flowing in the first branch is modulated by way of a first switch and allows an activation/deactivation of the actuator.

The intensity of current flowing in the second branch is modulated by way of a second switch and allows, inter alia, communication from the detection sensor to the BCM of the information item according to which an event has been detected.

Thus, the communication of the information item according to which an event has been detected by the detection sensor can be carried out concomitantly with the activation/deactivation of the actuator, without creating interference in the communication of the information item.

The duty ratio X % is chosen in such a way that, when the actuator is activated or in the process of activation/deactivation, the intensity of current flowing in the first branch is in the low state for a minimum duration at least greater than the duration necessary for the communication of the information item according to which an event has been detected.

According to preferred modes of implementation, the invention furthermore addresses the following characteristics, implemented separately or as each of their technically operative combinations.

In preferred modes of implementation of the invention, the actuator is a light source and the detection sensor drives a turning on/turning off of the light source by modulating the intensity of the current flowing in said light source in such a way that:
  the light source is turned off when the intensity of the current flowing in the light source is in the low state,
  the light source is turned on when the intensity of the current flowing in the light source evolves between the low state and the high state, with a constant duty ratio of X %.

When the light source is turned on, the intensity of current flowing in the second branch is defined so as to be complementary to the intensity of current flowing in the first branch in such a way that the intensity of current flowing in the supply line is maintained in the higher state. When a predefined event is detected by the detection sensor:
  when the light source is turned off, the intensity of current flowing on the supply line is in the lower state, the microcontroller of said detection sensor notifies the microcontroller of the electronic module with an information item according to which the event has been detected, in the form of a predefined modulation of the intensity of current flowing in the supply line with respect to the lower state,
  when the light source is turned on, the microcontroller of said detection sensor notifies the microcontroller of the electronic module with an information item according to which the event has been detected, in the form of a predefined modulation of the intensity of current flowing in the supply line with respect to the higher state, solely when the intensity of current flowing in the light source is in the low state.

Preferably, the light source is a light-emitting diode LED.

In preferred modes of implementation of the invention, the detection sensor drives a gradual turning on/turning off of the light source by modulating the intensity of the current flowing in said light source in such a way that:
  the light source illuminates in a gradual manner when the intensity of the current flowing in the light source evolves between the low state and the high state, with a duty ratio increasing gradually from 0% to X %,
  the light source turns off in a gradual manner when the intensity of the current flowing in the light source evolves between the low state and the high state, with a duty ratio decreasing gradually from X % to 0%,
  when the light source is in the process of turning on/turning off, the intensity of current flowing in the second branch is defined so as to be complementary to the intensity of current flowing in the first branch in such a way that the intensity of current flowing in the supply line is maintained in the higher state.

when a predefined event is detected by the detection sensor, when the light source is in the process of turning on/turning off, the microcontroller of said detection sensor notifies the microcontroller of the electronic module with an information item according to which the event has been detected, in the form of a predefined modulation of the intensity of current flowing in the supply line with respect to the higher state, solely when the intensity of current flowing in the light source is in the low state.

According to the invention, the intensity of current flowing in the first branch is modulated by way of a first switch and allows the gradual turning on/turning off of the light source.

The intensity of current flowing in the second branch is modulated by way of a second switch and allows, inter alia, communication from the detection sensor to the BCM of the information item according to which an event has been detected.

Thus, the communication of the information item according to which an event has been detected by the detection sensor can be carried out concomitantly with the turning on/turning off of the LED, without creating interference and without impacting the brightness of the light source or the communication of the information item.

The duty ratio X % is chosen in such a way that, when the light source is turned on or in the process of turning on/turning off, the intensity of current flowing in the first branch is in the low state for a minimum duration at least greater than the duration necessary for the communication of the information item according to which an event has been detected.

In a mode of implementation of the method, X is chosen so as to be at the maximum at 80, allowing a brightness of the light source close to the maximum possible brightness of the light source.

According to a second aspect, the invention relates to a communication device comprising an electronic module and a detection sensor, said detection sensor comprising a circuit comprising a first branch, comprising an actuator and a first switch, and a second branch, comprising a second switch. The two branches are supplied with current by way of a supply line connected to a voltage source. The electronic module is suitable for measuring the modulations of the intensity of the current flowing on said supply line. The detection sensor is configured, when the actuator is activated or in the process of gradual activation, so as to:
cause, by way of the first switch, a gradual modulation of the intensity of the current flowing in said actuator between a high state and a low state,
cause, by way of the second switch, a gradual modulation of the intensity of the current flowing in the second branch between a low state when the intensity of the current flowing in the actuator is in a high state and a high state when the intensity of the current flowing in the actuator is in a low state, in such a way that the intensity of the current flowing in the supply line is always in a so-called higher state, and
notify the electronic module, when it has detected a predefined event, with an information item according to which the event has been detected, in the form of a predefined modulation of the intensity of current flowing in the second branch, solely when the intensity of current flowing in the actuator is in the low state.

In a preferred embodiment, the actuator is a light source.

The invention also relates to a vehicle comprising a communication device such as described above.

BRIEF DESCRIPTION OF THE DRAWINGS

The invention will now be more precisely described within the framework of preferred embodiments, which are in no way limiting thereof, represented in FIGS. 1 to 5, in which.

DETAILED DESCRIPTION OF THE INVENTION

Figure 2:
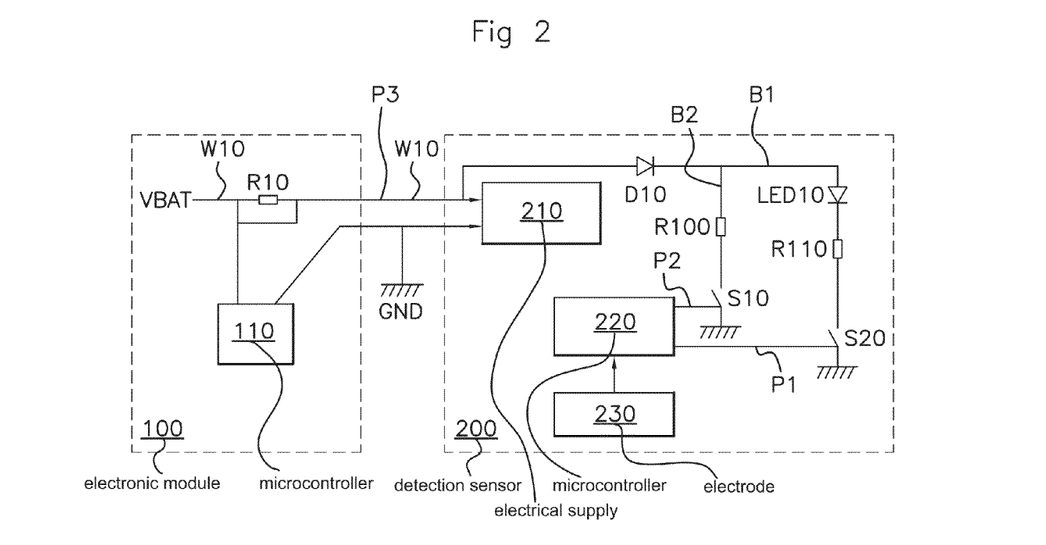
FIG. 2 represents an electrical diagram of a device for communication between a detection sensor equipped with an LED and a BCM, according to the invention.

A communication device according to the invention, illustrated in FIG. 2, comprises:
an electronic module 100, in our example a BCM,
a detection sensor 200, of capacitive type,
a current-supply line W10 connecting the BCM 100 to the sensor 200.

The BCM 100 comprises a microcontroller 110 connected to a voltage of the battery VBAT by the current-supply line W10 and connected to a ground GND. The BCM 100 furthermore comprises a resistor R10, situated on the supply line W10, across the terminals of which the microcontroller 110 and associated electronics (not represented) are connected.

The detection sensor 200 comprises:
an electrical supply 210 connected directly to the voltage of the battery VBAT, via the supply line W10, and connected to the ground GND by the BCM 100,
a microcontroller 220, connected to a capacitive electrode 230 for detecting approach and/or contact,
a first branch B1 comprising a light source, in our example a light-emitting diode, termed LED, LED10, a resistor R110 and a first switch S20,
a second electrical branch B2 comprising a resistor R100 and a second switch S10.

The two branches B1, B2 are connected to the supply line W10.

The two switches S10, S20, preferably in the form of a transistor, are each connected to an output of the microcontroller 220.

The microcontroller 110 of the BCM 100 and its associated electronics is suitable for measuring modulations of the intensity of the current flowing on the supply line W10.

The communication device is particularly suitable for detecting the approach and/or contact of a user in a locking/unlocking zone of a vehicle door, especially of an automotive vehicle. In the example described in an non-restrictive manner, the detection sensor 200 is integrated into a door handle of the vehicle and is able to detect this approach and/or contact and then to dispatch a communication signal to the BCM 100 which, after analysis, undertakes the unlocking of said automotive vehicle. The LED LED10, integrated into the detection sensor 200, allows, for its part, the lighting of a locking zone situated in the handle so as to direct the user toward said handle.

Events, such as for example the presence of an authorized user around the vehicle, originating from other sensors/actuators of the vehicle, are detected by the BCM 100. The latter centralizes these information items and, as a function of the latter, dispatches a request signal for turning on the LED LED10 to the detection sensor 200.

The invention is described with an LED LED10 as nonlimiting example of an actuator. Other actuators other than an LED can also be activated by the device and method of the invention.

The detection sensor 200 generates in return:
a first control signal at the switch S20 which makes it possible to modulate the intensity of current flowing in the first branch B1, and therefore in the LED LED10, causing it to turn on/turn off,
a second control signal at the switch S10 which makes it possible to modulate the intensity of current flowing in the second branch B2.

The first control signal, dispatched by the microcontroller 220 of the detection sensor 200 to the transistor S20, is generated in the form of a Pulse Width Modulation digital signal, commonly called a PWM signal of duty ratio lying between 0 and X %, X being strictly less than 100%. The switch S20 is then opened and closed in a periodic manner to undertake the inrush of current originating from the BCM 100 so as to gradually turn on/turn off the LED LED10.

In the exemplary embodiment, the modulation of the intensity of the current flowing in the LED LED10 is such that the LED LED10 turns on gradually from 0% to 80% of illumination. The modulation of the intensity of the current flowing in the LED LED10 consists of a pulse width modulation of the intensity of the current of gradual duty ratio lying between 0 and 80%, where 0% corresponds to the case where the LED LED10 is turned off and 80% corresponds to the case where the LED LED10 is turned on to its authorized maximum.

With a duty ratio at 80%, the LED LED10 is in its maximum illumination regime, the user observes a continuous illumination of the LED LED10, without brightness fluctuation, even if the illumination is not the maximum possible illumination for the LED LED10.

Figure 3A:
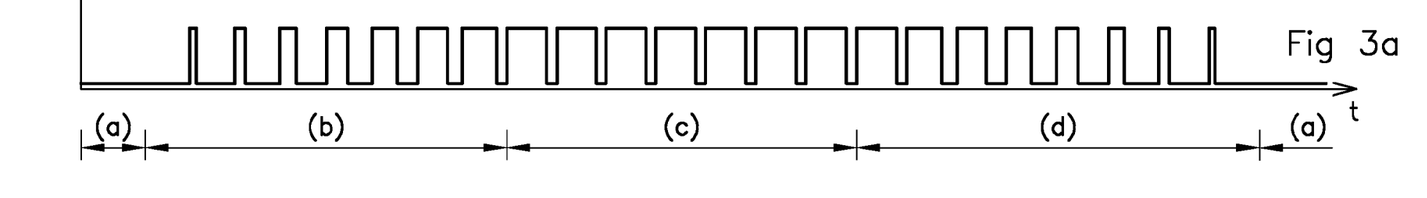
FIG. 3a illustrates, as a function of time, a first control signal for the turning on/turning off of the LED, at the point P1, when no approach D has been detected.

FIG. 3a represents the first control signal, as a function of time, at the point P1 (at the output of the microcontroller 220 of the detection sensor 200), when no approach and/or contact has been detected by the detection sensor 200 and therefore when no communication from the detection sensor 200 to the BCM 100 is required.

By definition, the duty ratio of a signal is defined as the ratio of the time spent by the signal in a so-called final state to a period of the signal.

The control signal (PWM signal) decomposes into four phases, as illustrated in FIG. 3a:

a) a phase where the duty ratio of the first control signal is at 0% (represented by the portion (a) in FIG. 3a); the intensity of the current flowing in the LED LED10 which stems therefrom is in a so-called low state, and the LED LED10 is turned off continuously, b) a phase where the duty ratio of the control signal is at 80% (represented by the portion (c) in FIG. 3a); the intensity of the current flowing in the LED LED10 which stems therefrom is such that it varies between the low state and a so-called high state and that the pulse width of the intensity of the current is constant at 80%, the LED LED10 is turned on continuously, without evolution of its brightness, c) a phase where the duty ratio of the control signal varies gradually from 0% to 80% (represented by the portion (b)); the intensity of the current flowing in the LED LED10 which stems therefrom is such that it varies between the high state and the low state and that the pulse width of the intensity of the current increases from 0 to 80%, d) a phase where the duty ratio of the control signal varies gradually from 80% to 0% (represented by the portion (d) in FIG. 3a); the intensity of the current flowing in the LED LED10 which stems therefrom is such that it varies between the high state and the low state and that the pulse width of the intensity of the current decreases from 80 to 0%.

In an exemplary embodiment, the duration of the gradual turn-on (or turn-off) phase is 700 ms.

The second control signal (cf. FIG. 3b), dispatched by the microcontroller 220 of the detection sensor 200 to the transistor S10, is generated in a manner such that:
when the LED LED10 is turned off (intensity of the current flowing therein is in the low state), the intensity of the current flowing in the second branch B2 is also in a low state,
when the LED LED10 is turned on or in the process of turning on/turning off (intensity of the current flowing therein is either in the high state or in the low state), the intensity of the current flowing in the second branch B2 is complementary to the intensity of current flowing in the first branch B1 in such a way that:
when the intensity of the current flowing in the LED LED10 is in the low state, the intensity of the current flowing in the second branch B2 is in the high state,
when the intensity of the current flowing in the LED LED10 is in the high state, the intensity of the current flowing in the second branch B2 is in the low state.

Figure 3B:
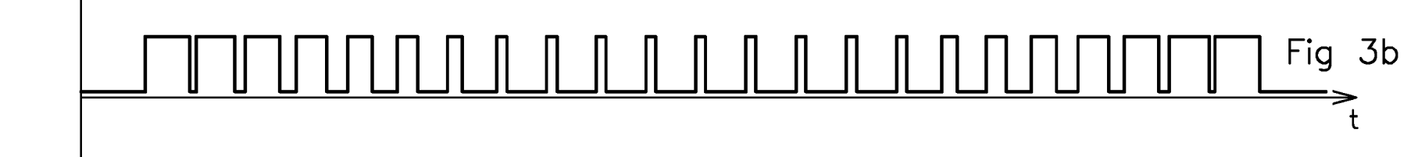
FIG. 3b illustrates, as a function of time, a second control signal for the modulation of the intensity of the current flowing in a second branch, at the point P2, when no approach D has been detected.

The second control signal is therefore generated in the form of a pulse width modulation digital signal, of duty ratio lying between 100 and (100−X) %, X being equal to 80% in this example. The switch S10 is then opened and closed in a periodic manner to undertake the inrush of current originating from the BCM 100.

FIG. 3b represents the second control signal, as a function of time, at the point P2 (at the output of the microcontroller 220 of the detection sensor 200), when no approach and/or contact has been detected by the detection sensor 200 and therefore when no communication from the detection sensor 200 to the BCM 100 is required. The modulation of the second control signal is dependent on the first control signal, and also lies between a low state and a high state.

Figure 3C:
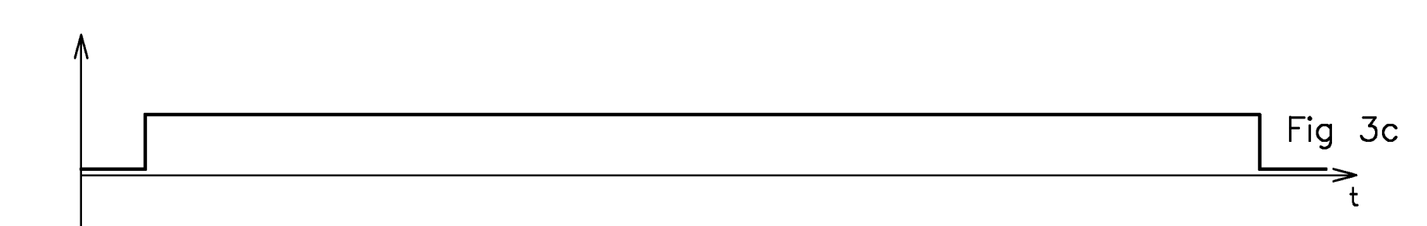
FIG. 3c illustrates, as a function of time, the output signal seen by the BCM, at the point P3, when no approach D has been detected.

FIG. 3c represents the output signal seen by the BCM 100, at the point P3 (at the output of the microcontroller 110 of the BCM 100), that is to say the modulations of the intensity of the current flowing on the supply line W10, as a function of the various phases of the first control signal, when no approach and/or contact has been detected by the detection sensor 200 and therefore when no communication from the detection sensor 200 to the BCM 100 is required.

It is thus clearly observed that the output signal seen by the BCM 100 is modulated between two states, a so-called lower state when the LED LED10 is turned off and a so-called higher state when the LED LED10 is turned on or in the process of turning on/turning off. From the point of view of the BCM 100, when the LED LED10 is turned on or in the process of turning on/turning off, there is always a current inrush, originating either from the first switch S20, or from the second switch S10.

When an approach and/or contact has been detected by the detection sensor 200, a communication signal must be dispatched, on the supply line W10, by the microcontroller 220 of the detection sensor 200 to the microcontroller 110 of the BCM 100.

The dispatching of the information item relating to the detection of approach of the detection sensor 200 to the BCM 100 by way of the supply line W10 remains identical to the prior art. More precisely, the detection by the electrode 230 of the approach of the user produces a communication signal which is dispatched by the microcontroller 220 of the detection sensor 200 in the form of current inrushes, opening/closing the second switch S10, to the microcontroller 110 of the BCM 100, that said microcontroller 110 of the BCM 100 detects and decodes. This communication signal lasts only a few milliseconds, and it is dispatched only when the microcontroller 220 of the detection sensor 200 detects the presence of a hand near the electrode 230.

The communication signal dispatched to the microcontroller 110 of the BCM 100 is an encoded signal of type known per se. It is defined in the form of a predefined modulation of the intensity of current flowing in the supply line W10. It is defined in such a way that it begins with a particular sequence, termed "start communication", which allows the BCM 100 to differentiate the start pulse (or bit) of a communication intended for it from a start pulse (or bit) for commencing illumination or for commencing the turning off of the LED LED10 and to indicate to the BCM 100 that the following information items are communication data.

The signal is also defined in such a way that it ends with a particular sequence, termed "stop communication" which makes it possible to indicate to the BCM 100 that the communication signal has finished.

Thus, the BCM 100 is able to differentiate the start and end of a communication signal from the start and end of a first control signal.

The communication of the communication signal from the detection sensor 200 to the BCM 100 must be done straightaway, without interference with the first control signal, that is to say without disturbing the illumination of the LED LED10.

The principle of the invention relies on the fact that, as soon as approach and/or contact are/is detected, the communication of the information item relating to this detection of the detection sensor 200 to the BCM 100, dispatched via the second branch B2, is performed only when the intensity of the current flowing in said second branch B2 is in the high state, that is to say when the intensity of the current flowing in said first branch B1 is in the low state. Thus, the control of turning on/turning off of the LED LED10 is not impacted by the dispatching of this information item and the LED LED10 continues to turn on/turn off gradually, without degradation of its brightness. The BCM 100 can readily deduce the communication signal.

Specifically, the principle consists in:
controlling the LED LED10 in such a way that the LED LED10 is in its maximum turn-on regime for a duty ratio of strictly less than 100%, preferably 80%, in such a way that time windows where the intensity of the current flowing in the LED LED10 is in the low state are created, when the LED LED10 is turned on or in the process of turning on/turning off, making an intensity of current flow in the second branch B2 so that the intensity of current flowing in the supply line W10 passes to the higher state, thus creating time windows where the intensity of current flowing in the second branch B2 is in the high state, when an approach has been detected, dispatching the communication signal via the second branch B2 when the intensity of the current flowing in said second branch is in the high state, when the LED LED10 is turned off, not making any intensity of current flow in the second branch B2 so that the intensity of current flowing in the supply line W10 is in the lower state, thus creating time windows where the intensity of current flowing in the second branch B2 is in the low state, when an approach has been detected, dispatching the communication signal via the second branch B2.

The time windows where the current flowing in the LED LED10 is in the low state, respectively the time windows where the current flowing in the second branch B2 is in the high state, are defined in such a way that the minimum time window is of sufficient duration to make it possible to pass the communication information item in its entirety, that is to say that its duration is at least greater than a duration of dispatching of a communication signal.

For example, if the duration of dispatching of a communication signal is 10 ms, the duration of the minimum time window is at least 10 ms.

Figure 4A:
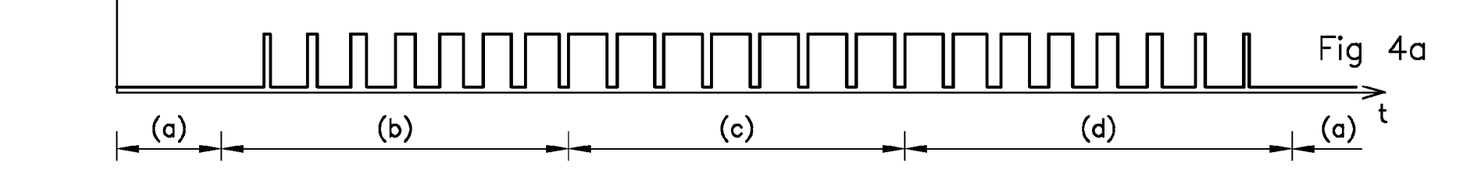
FIG. 4a illustrates, as a function of time, a first control signal for the turning on/turning off of the LED, at the point P1, when an approach D has been detected, for each phase of turning on/turning off of the LED.
Figure 4B:
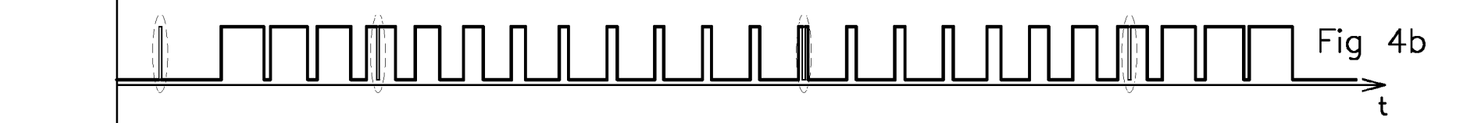
FIG. 4b illustrates, as a function of time, a second control signal for the modulation of the intensity of the current flowing in a second branch, at the point P2, when an approach D has been detected, for each phase of turning on/turning off of the LED.
Figure 4C:
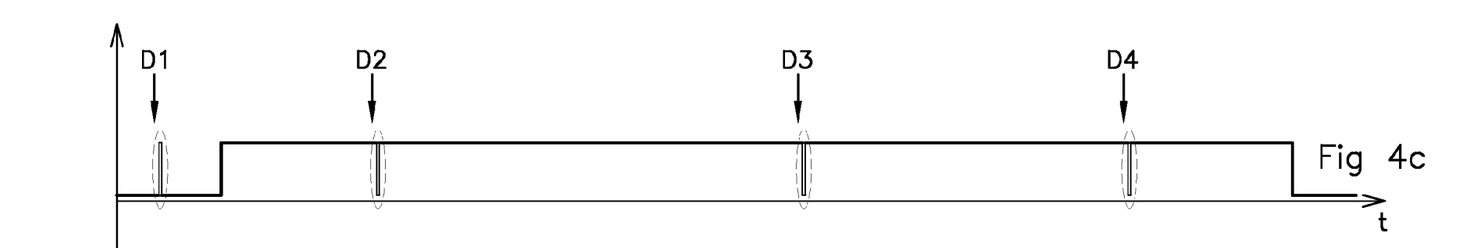
FIG. 4c illustrates, as a function of time, the output signal seen by the BCM, at the point P3, when an approach D has been detected, for each phase of turning on/turning off of the LED.

FIGS. 4*a*, 4*b*, 4*c* represent, as a function of time, the first control signal (at the point P1 of FIG. 2) (FIG. 4*a*), the second control signal (at the point P2 of FIG. 2) (FIG. 4*b*) and the output signal seen by the BCM 100 (at the point P3 of FIG. 2) (FIG. 4*c*), when an approach and/or contact D1, D2, D3 and D4 has been detected by the detection sensor 200 during each phase of turning on/turning off of the LED LED10, and therefore when a communication from the detection sensor 200 to the BCM 100 is required for each of the detections.

a) Detection of approach and/or contact D1, in the case where the LED LED10 is turned off When the LED LED10 is turned off and an approach and/or contact D1 of a user is detected by the detection sensor 200, the communication signal is dispatched from the microcontroller 220 of the detection sensor 200 to the microcontroller 110 of the BCM 100 via the second branch B2:

the current flowing in the first branch B1 is in the low state,
the current flowing in the second branch B2 is in the low state, except during the emission of the communication signal,
the current flowing in the supply line W10 is in the lower state, except during the emission of the communication signal.

b) Detection of approach and/or contact D2, D3, D4, in the case where the LED LED10 is turned on or in the process of turning on or of turning off When the LED LED10 is turned on or in the process of turning on/turning off and an approach and/or contact D2, D3 or D4 of a user is detected by the detection sensor 200, the communication signal is dispatched from the microcontroller 220 of the detection sensor 200 to the microcontroller 110 of the BCM 100 via the second branch B2, solely when the intensity of the current flowing in the second branch B2 is in the high state:

the current flowing in the first branch B1 is modulated between a high state and a low state, with a duty ratio varying gradually from 0 to 80% (corresponding to a gradual turning on of the LED LED10), or from 80 to 0% (corresponding to a gradual turning off of the LED LED10), or stable at 80% (corresponding to an LED LED10 which is on continuously), the current flowing in the second branch B2 is complementary to the current flowing in the first branch B1, the current flowing in the supply line W10 is in the higher state, except during the emission of the communication signal.

The description hereinabove clearly illustrates that through its various characteristics and their advantages, the present invention achieves the objectives that it sought. In particular, it proposes a device and a method allowing a communication between the BCM 100 and the detection sensor 200 by way of a single supply line W10, by managing the communication from the detection sensor 200 to the BCM 100 and the turning on/turning off of the light source LED10, while ensuring the functionality of capacitive detection and of communication of this detection straightaway when a predefined event is detected by the detection sensor 200 and without impacting the brightness of the light source LED100.

The invention claimed is:

1. A method for communication between an electronic module (100) and a detection sensor (200), the electronic module (100) being connected to the detection sensor (200) via a supply line (W10), the electronic module (100) comprising a microcontroller (110) and a voltage source (VBAT) connected to the supply line (W10), the detection sensor (200) comprising a microcontroller (220), a circuit comprising a first branch (B1) connected in parallel with a second branch (B2), each of the first and second branches (B1, B2) being connected to said microcontroller of the detection sensor via a switch (S20, S10), the detection sensor (200) comprising, on the first branch (B1), an actuator (LED10), said first and second branches (B1, B2) being supplied with current flowing on the supply line (W10) connected to the voltage source (VBAT), said electronic module (100) being configured for measuring modulations of intensity of the current flowing on said supply line (W10) between a lower state and a higher state, wherein the detection sensor (200) controls the actuator (LED10) by modulating the intensity of current flowing in said actuator by the steps of:

having the actuator (LED10) be in a first position when the intensity of the current flowing in the actuator (LED10) is in the low state, placing the actuator (LED10) in a second position when the intensity of the current flowing in the actuator (LED10) evolves between the low state and the high state, wherein the actuator (LED10) evolves between the low state and the high state based on a control signal with a constant duty ratio of X %, X being strictly less than 100, wherein, when the actuator (LED10) is in the second position, the intensity of current flowing in the second branch (B2) is defined so as to be complementary to the intensity of current flowing in the first branch (B1) in such a way that the intensity of current flowing in the supply line (W10) is maintained in the higher state, when a predefined event (D) is detected by the detection sensor (200) and i) the actuator (LED10) is in the first position, and ii) the intensity of current flowing on the supply line (W10) is in the lower state, the microcontroller (220) of said detection sensor (200) notifies the microcontroller (110) of the electronic module (100) with an information item according to which the predefined event (D) has been detected, in the form of a predefined modulation of the intensity of current flowing in the supply line (W10) with respect to the lower state, and when the predefined event (D) is detected by the detection sensor (200) and the actuator (LED10) is in the second position, the microcontroller (220) of said detection sensor (200) notifies the microcontroller (110) of the electronic module (100) with an information item according to which the predefined event (D) has been detected, in the form of a predefined modulation of the intensity of current flowing in the supply line (W10) with respect to the higher state, solely when the intensity of current flowing in the actuator (LED10) is in the low state.

2. The method for communication as claimed in claim 1, wherein, the actuator is a light source (LED10) and the detection sensor (200) drives a turning on/turning off of the light source (LED10) by modulating the intensity of the current flowing in said light source (LED10), such that:

the light source (LED10) is turned off when the intensity of the current flowing in the light source (LED10) is in the low state, the light source (LED10) is turned on when the intensity of the current flowing in the light source (LED10) evolves between the low state and the high state, with the control signal having the constant duty ratio of X %, when the light source (LED10) is turned on, the intensity of current flowing in the second branch (B2) is defined so as to be complementary to the intensity of current flowing in the first branch (B1) in such a way that the intensity of current flowing in the supply line (W10) is maintained in the higher state, when i) the predefined event (D) is detected by the detection sensor (200), ii) the light source (LED10) is turned off, and iii) the intensity of current flowing on the supply line (W10) is in the lower state, the microcontroller (220) of said detection sensor (200) notifies the microcontroller (110) of the electronic module (100) with an information item according to which the predefined event (D) has been detected, in the form of a predefined modulation of the intensity of current flowing in the supply line (W10) with respect to the lower state, and when i) the predefined event (D) is detected by the detection sensor (200), and ii) the light source (LED10) is turned on, the microcontroller (220) of said detection sensor (200) notifies the microcontroller (110) of the electronic module (100) with an information item according to which the predefined event (D) has been detected, in the form of a predefined modulation of the intensity of current flowing in the supply line (W10) with respect to the higher state, solely when the intensity of current flowing in the light source (LED10) is in the low state.

3. The method for communication as claimed in claim 2, wherein, the detection sensor (200) drives a gradual turning on/turning off of the light source (LED10) by modulating the intensity of the current flowing in said light source, such that:

the light source (LED10) illuminates in a gradual manner when the intensity of the current flowing in the light source (LED10) evolves between the low state and the high state, with the duty ratio of the control signal increasing gradually from 0% to X %, the light source (LED10) turns off in a gradual manner when the intensity of the current flowing in the light source (LED10) evolves between the low state and the high state, with a duty ratio of the control signal decreasing gradually from X % to 0%, when the light source (LED10) is in the process of turning on/turning off, the intensity of current flowing in the second branch (B2) is defined so as to be complementary to the intensity of current flowing in the first branch (B1) in such a way that the intensity of current flowing in the supply line (W10) is maintained in the higher state, and when i) the predefined event (D) is detected by the detection sensor (200), and ii) the light source (LED10) is in the process of turning on/turning off, the microcontroller (220) of said detection sensor (200) notifies the microcontroller (110) of the electronic module (100) with an information item according to which the predefined event (D) has been detected, in the form of a predefined modulation of the intensity of current flowing in the supply line (W10) with respect to the higher state, solely when the intensity of current flowing in the light source (LED10) is in the low state.

4. A communication device comprising:

an electronic module (100) comprising a voltage source (VBAT) connected to a supply line (W10); and a detection sensor (200), the electronic module (100) being connected to the detection sensor (200) via the supply line (W10), said detection sensor comprising a circuit comprising i) a first branch (B1) comprising an actuator (LED10) and a first switch (S20), and ii) a second branch (B2) comprising a second switch (S10), said first and second branches (B1, B2) being supplied with current via the supply line (W10) connected to the voltage source (VBAT), said electronic module (100) being configured for measuring modulations of intensity of the current flowing on said supply line (W10), wherein, the detection sensor (200) is configured, when the actuator (LED10) is activated or in a process of gradual activation:

to use the first switch (S20) to cause a gradual modulation of the intensity of the current flowing in said actuator (LED10) between a high state and a low state, to use the second switch (S10) to cause a gradual modulation of the intensity of the current flowing in the second branch (B2) between i) a low state when the intensity of the current flowing in the actuator (LED10) is in a high state and ii) a high state when the intensity of the current flowing in said actuator (LED10) is in a low state, in such a way that the intensity of the current flowing in the supply line (W10) is always in a higher state, and to notify the electronic module (100) upon detection of a predefined event (D), with an information item according to which the predefined event (D) has been detected, in the form of a predefined modulation of the intensity of current flowing in the second branch (B2), solely when the intensity of current flowing in the actuator (LED10) is in the low state.

5. The communication device as claimed in claim 4, wherein the actuator (LED10) is a light source.

6. An automotive vehicle comprising a communication device as claimed in claim 4.

7. An automotive vehicle comprising a communication device as claimed in claim 5.

* * * * *